United States Patent
Konishi et al.

(10) Patent No.: US 11,837,730 B2
(45) Date of Patent: Dec. 5, 2023

(54) SECONDARY BATTERY ELECTRODE

(71) Applicant: Toray Industries, Inc., Tokyo (JP)

(72) Inventors: Takashi Konishi, Otsu (JP); Eiichiro Tamaki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 598 days.

(21) Appl. No.: 16/489,507

(22) PCT Filed: Nov. 1, 2017

(86) PCT No.: PCT/JP2017/039581
§ 371 (c)(1),
(2) Date: Aug. 28, 2019

(87) PCT Pub. No.: WO2018/168059
PCT Pub. Date: Sep. 20, 2018

(65) Prior Publication Data
US 2020/0075937 A1   Mar. 5, 2020

(30) Foreign Application Priority Data
Mar. 13, 2017   (JP) ................................. 2017-046978

(51) Int. Cl.
*H01M 4/62* (2006.01)
*H01M 4/1391* (2010.01)
(Continued)

(52) U.S. Cl.
CPC ......... *H01M 4/625* (2013.01); *H01M 4/1391* (2013.01); *H01M 4/1393* (2013.01);
(Continued)

(58) Field of Classification Search
CPC .... H01M 4/364; H01M 4/1391; H01M 4/621; H01M 4/1393; H01M 4/625; G06V 10/50
See application file for complete search history.

(56) References Cited

U.S. PATENT DOCUMENTS

| 2015/0140438 A1* | 5/2015 | Sun ....................... H01M 4/625 429/231.95 |
| 2016/0009561 A1 | 1/2016 | Coleman et al. |

(Continued)

FOREIGN PATENT DOCUMENTS

| JP | 2012014838 A | 1/2012 |
| JP | 2015059079 A | 3/2015 |

(Continued)

OTHER PUBLICATIONS

International Search Report and Written Opinion for International Application No. PCT/JP2017/039581 dated Jan. 30, 2018, 6 Pages.

(Continued)

*Primary Examiner* — Amanda C. Walke
(74) *Attorney, Agent, or Firm* — RatnerPrestia (57) ABSTRACT

A secondary battery electrode is provided that may achieve a non-aqueous electrolyte secondary battery having a high energy output density with a small amount of a conductive aid. The secondary battery electrode has a mixture layer containing graphene and a secondary battery active substance. The secondary battery electrode has a mean aspect ratio of 2.0 or greater in an electric conductive material portion from a cross section of the secondary battery electrode, as specified by the method described below. The method for specifying the electric conductive material portion comprises: (1) acquiring, by scanning spreading resistance microscopy, a mapping image and a histogram of spreading resistance values for a mixture layer portion; and (2), defining R1 as the lowest resistance value in the histogram, accumulating sequentially from R1 the frequency, defining R2 as the spreading resistance value when the cumulative frequency has exceeded 3% relative to the cumulative frequency over the entire data, further defining R3 as a spreading resistance value of ten times R2, and, with R3 serving as the threshold value, binarizing the mapping (Continued)

image to define as the electric conductive material portion the portion having a resistance value of R3 or lower.

9 Claims, 3 Drawing Sheets

(51) Int. Cl.
*H01M 4/1393* (2010.01)
*H01M 4/36* (2006.01)
*H01M 10/0525* (2010.01)
*G06V 10/50* (2022.01)

(52) U.S. Cl.
CPC ........... *H01M 4/364* (2013.01); *H01M 4/621* (2013.01); *H01M 10/0525* (2013.01); *G06V 10/50* (2022.01)

(56) References Cited

U.S. PATENT DOCUMENTS

| | | | |
|---|---|---|---|
| 2016/0294001 A1* | 10/2016 | Suga | H01M 4/133 |
| 2017/0346098 A1 | 11/2017 | Yang et al. | |
| 2018/0261402 A1 | 9/2018 | Manabe et al. | |
| 2018/0261830 A1 | 9/2018 | Yang et al. | |
| 2018/0269465 A1 | 9/2018 | Hirai et al. | |
| 2018/0277829 A1 | 9/2018 | Konishi et al. | |
| 2019/0051903 A1 | 2/2019 | Mamabe et al. | |

FOREIGN PATENT DOCUMENTS

| | | |
|---|---|---|
| JP | 2015215947 A | 12/2015 |
| JP | 2016515090 A | 5/2016 |
| JP | 2017218373 A | 12/2017 |
| WO | 2013181994 A1 | 12/2013 |
| WO | 2015120785 A1 | 8/2015 |
| WO | 2016056557 A1 | 4/2016 |
| WO | 2017047521 A1 | 3/2017 |
| WO | 2017047522 A1 | 3/2017 |
| WO | 2017047523 A1 | 3/2017 |
| WO | 2017061323 A1 | 4/2017 |
| WO | 2017154533 A1 | 9/2017 |

OTHER PUBLICATIONS

Konishi et al., "Effect of Graphene in the Cathode of Lithium Ion Rechargeable Battery", 57th Battery Symposium in Chiba, Japan, Nov. 29-Dec. 1, 2016 with partial translation, 1 page.

* cited by examiner

SECONDARY BATTERY ELECTRODE

CROSS REFERENCE TO RELATED APPLICATIONS

This is the U.S. National Phase application of PCT/JP2017/039581, filed Nov. 1, 2017, which claims priority to Japanese Patent Application No. 2017-046978, filed Mar. 13, 2017, the disclosures of these applications being incorporated herein by reference in their entireties for all purposes.

FIELD OF THE INVENTION

The present invention relates to a secondary battery electrode such as an electrode for a lithium ion battery.

BACKGROUND OF THE INVENTION

In recent years, research and development has been actively made on non-aqueous electrolyte secondary batteries for portable devices such as smartphones and mobile phones, hybrid vehicles, electric vehicles, and household electricity storage applications.

Since non-aqueous electrolyte secondary batteries used in these fields contain active materials having poor electron conductivity, such as metal oxides, it is difficult to achieve output characteristics required of non-aqueous electrolyte secondary batteries. Therefore, electrodes containing, in addition to the active material, a conductive additive such as a carbon material are used for imparting electron conductivity.

Further, secondary batteries are also required to have improved energy density in addition to the output characteristics, and thus it is necessary to reduce a conductive additive and a binder that do not contribute to the battery capacity. However, the conductive additive is easily aggregated and unevenly distributed within an electrode mixture containing the active material, the conductive additive, and the binder. Therefore, if the conductive additive is reduced, the electron conductivity inside the electrode is extremely reduced, and it is difficult to achieve desired output characteristics. It is important how efficiently form a conductive network in the electrode for achieving desired output characteristics.

In order to solve this problem, in Patent Document 1, it is proposed to improve the conductive network and increase the capacity by defining, within certain ranges, the average particle size, average area, and aspect ratio of aggregates of a conductive additive, which are obtained by image analysis of a surface photograph of a negative electrode taken using a scanning electron microscope.

In Patent Document 2, it is proposed to improve the conductive network and increase the capacity by defining, within certain ranges, the size and distribution state of aggregates of a conductive additive, which are obtained by analysis of a mapping image of carbon at an electrode cross section, as well as the resistance value of the electrode.

PATENT DOCUMENTS

Patent Document 1: Japanese Patent Laid-open Publication No. 2012-14838
Patent Document 2: Japanese Patent Laid-open Publication No. 2015-215947

SUMMARY OF THE INVENTION

In Patent Document 1, since a carbon material containing primary particles in an aggregated state is used, the carbon material is present in the form of aggregates also in the electrode. When the aggregates are present as a mass that is larger than a certain range in the electrode, the proportion of a portion where the active material and the conductive additive do not come into contact with each other is large, and the electronic resistance at the surface of the active material increases, so that the output of the battery decreases.

In Patent Document 2, since carbon black containing aggregates of secondary particles is used, the maximum cross-sectional area of the aggregates is extremely large such as 400 $\mu m^2$ or more and 1000 $\mu m^2$ or less, and the proportion of a portion where the conductive additive is absent is still large. Therefore, the effect of improving the output characteristics and energy density of the battery is insufficient.

An object of the present invention is to provide an electrode having both improved output characteristics and improved energy density.

The present invention for solving the above-mentioned problems is
a secondary battery electrode including a mixture layer containing graphene and a secondary battery active material,
wherein conductive material portions in a cross section of the secondary battery electrode, the conductive material portions being determined by a method described below, have an average aspect ratio of 2.0 or more:
the method of determining the conductive material portions:
(1) acquiring a mapping image and a histogram of spreading resistance values of a mixture layer portion by scanning spreading resistance microscopy; and
(2) defining the lowest resistance value in the histogram as R1 sequentially accumulating frequency from R1 defining the spreading resistance value when the cumulative frequency exceeds 3% of the cumulative frequency of entire data as R2, further defining the spreading resistance value that is 10 times of R2 as R3, binarizing the mapping image with R3 as a threshold, and defining portions having a resistance value equal to or less than R3 as the conductive material portions.

According to the present invention, it is possible to provide a secondary battery electrode that is capable of achieving a non-aqueous electrolyte secondary battery having high energy output density with a small amount of a conductive additive.

DETAILED DESCRIPTION OF EMBODIMENTS OF THE INVENTION

<Secondary Battery Electrode>

The secondary battery electrode (hereinafter sometimes simply referred to as "electrode") of the present invention includes a mixture layer containing graphene and a secondary battery active material.

[Graphene]

In the secondary battery electrode according to the present invention, graphene is used as a conductive additive. Graphene has a thin layer shape, has a large number of conductive paths per unit weight, and easily forms a good conductive network in the electrode. In a narrow sense, the word "graphene" refers to a sheet of $sp^2$-bonded carbon atoms having a thickness of one atom (single-layer graphene). Herein, a thin section-shaped laminate of single-layer graphene is also referred to as graphene. The word "graphene oxide" is also a designation including thin section-shaped laminates.

The thickness of graphene used in the present invention is not particularly limited, but is preferably 100 nm or less, more preferably 50 nm or less, still more preferably 20 nm or less. As the thickness of graphene, a value obtained in the following manner is used. First, graphene is diluted with N-methylpyrrolidone (NMP) to 0.002% by mass, dropped on a glass substrate, and dried. Then, graphene on the substrate is observed with a laser microscope capable of measuring a three-dimensional shape, and the thickness of each graphene layer is measured. When the thickness is varied in one graphene layer, the area average of the thicknesses is obtained. In this way, the thicknesses of 50 randomly selected graphene layers are calculated, and the average thereof is taken as the thickness of graphene.

The size of graphene in the planar direction is also not particularly limited, but the lower limit is preferably 0.5 μm or more, more preferably 0.7 μm or more, still more preferably 1 μm or more, and the upper limit is preferably 50 μm or less, more preferably 10 μm or less, still more preferably 5 μm or less. The size of graphene in the planar direction as used herein means the average of the longest diameter and the shortest diameter of the graphene surface.

The specific surface area of graphene reflects the thickness of graphene and the degree of peeling of graphene. The larger the specific surface area of graphene is, the thinner graphene is, and the higher the degree of peeling is. When the specific surface area of graphene is small, that is, the degree of peeling is low, it becomes difficult to form a conductive network of the electrode. Alternatively, when the specific surface area of graphene is large, that is, the degree of peeling is high, graphene is easily aggregated to have low dispersibility, and becomes difficult to handle. Graphene used in the present invention preferably has a specific surface area of 80 $m^2/g$ or more and 250 $m^2/g$ or less, more preferably 100 $m^2/g$ or more and 200 $m^2/g$ or less, still more preferably 130 $m^2/g$ or more and 180 $m^2/g$ or less as measured by the BET measurement method. The BET measurement method is performed according to the method described in JIS Z 8830: 2013. The measurement of the adsorption gas quantity is performed by a carrier gas method, and the analysis of the adsorption data is performed by a single point method.

Graphene used in the present invention preferably has an element ratio of oxygen to carbon (O/C ratio) of 0.08 or more and 0.30 or less as measured by X-ray photoelectron spectroscopy. If the amount of oxygen atoms on the graphene surface is too small, graphene is poorly dispersed. Conversely, too many oxygen atoms mean a state where graphene is not sufficiently reduced, and the n-electron conjugated structure is not restored and the electric conductivity tends to be lowered. The oxygen atoms on the graphene surface are derived from an oxygen atom-containing functional group having high polarity, such as a hydroxy group (—OH), a carboxyl group (—COOH), an ester bond (—C(=O)—O—), an ether bond (—C—O—C—), a carbonyl group (—C(=O)—), and an epoxy group. A surface treatment agent is sometimes added to graphene. In such a case, not only the oxygen atoms derived from the functional group of graphene itself but also the oxygen atoms derived from the functional group of the surface treatment agent are included in the "oxygen atoms on the graphene surface". That is, in graphene to which the surface treatment agent is added, the O/C ratio of the surface after the treatment with the surface treatment agent is preferably within the above-mentioned range. The O/C ratio of graphene is more preferably 0.12 or more and 0.20 or less, still more preferably 0.14 or more and 0.17 or less.

In the X-ray photoelectron spectroscopy, a surface of a sample placed in an ultra-high vacuum is irradiated with soft X-rays, and photoelectrons emitted from the surface are detected with an analyzer. The photoelectrons are measured by wide scan, and the value of binding energy of bound electrons in the substance is obtained to acquire elemental information on the substance surface. Furthermore, the element ratio can be quantified using the peak area ratio.

The element ratio of carbon to oxygen can be controlled, for example, by changing the degree of oxidation of graphene oxide as a raw material or by changing the amount of the surface treatment agent in the case where a chemical peeling method is employed. The higher the degree of oxidation of graphene oxide is, the larger the amount of oxygen remaining after the reduction is, and the lower the degree of oxidation is, the smaller the amount of oxygen after the reduction is. As the adhesion amount of the surface treatment agent having an acidic group is larger, the amount of oxygen can be increased. As the surface treatment agent, a compound having an amino group and an acidic group is preferable, and dopamine hydrochloride is particularly preferable.

[Secondary Battery Active. Material]

The secondary battery active material is a material capable of occluding and releasing lithium ions electrochemically. Examples of the secondary battery active material include a positive electrode active material of a lithium ion battery, a negative electrode active material of a lithium ion battery, a sulfur active material, and a positive electrode (air electrode) active material of a metal-air battery.

The secondary battery active material used in the present invention is not particularly limited. As the positive electrode active material, metal oxide active materials such as lithium manganate having a spinel structure ($LiMn_2O_4$), lithium manganate having a rock salt structure ($LiMnO_2$), lithium cobaltate ($LiCoO_2$), lithium nickelate ($LiNiO_2$), a ternary system in which nickel is partially substituted with manganese and cobalt ($LiNi_xMn_yCo_{1-x-y}O_2$), a ternary system in which nickel is partially substituted with cobalt and aluminum ($LiNi_xCo_yAl_{1-x-y}O_2$), and $V_2O_5$, metal compound active materials such as $TiS_2$, $MoS_2$, and $NbSe_2$, lithium iron phosphate ($LiFePO_4$) and lithium manganese phosphate ($LiMnPO_4$) having an olivine structure, and solid solution active materials can be used.

As the negative electrode active material, materials capable of forming an alloy with lithium, such as titanium (Ti), tin (Sn), lead (Pb), indium (In), silicon (Si), antimony (Sb), bismuth (Bi), gallium (Ga), germanium (Ge), arsenic (As), hafnium (Hf), zirconium (Zr), and yttrium (Y), silicon compounds containing Si, SiO, SiC, SiOC or the like as basic constituent elements, and lithium-doped conductive polymers, such as polyacetylene and polypyrrole can be used.

In particular, an active material having a volume specific resistance value of $10^2$ Ω·cm or more is preferable in view of producing the effects of the present invention because such active material has low electron conductivity. The volume specific resistance value is a resistance value per unit volume and is inherent to a material, and is also referred to as volume resistivity. Herein, the volume specific resistance value is measured by powder resistance measurement. The powder resistance measurement is performed by a method of pressing an active material powder to produce an electrode, and measuring the resistance value of the electrode by a four-probe method. An example of an apparatus used in such measurement is a powder resistance measurement system (model MCP-PD51) manufactured by Mitsubishi Chemical Analytech Co., Ltd. In the powder resistance measurement, under a small pressing force, the powder resistance value is reduced with an increase of the pressing force because the voids are reduced and the contact between particles increases. However, the number of contact points between the particles is saturated at some pressing force, and the change in powder resistance value is no longer observed. The powder resistance values at various pressing forces of 0.5 t, 1 t, 2 t, 3 t, 5 t, 7 t, and 10 t are measured, and the maximum value among the measured powder resistance values is taken as the volume specific resistance.

Examples of the positive electrode active material having a volume specific resistance value of $10^2$ Ω·cm or more include lithium manganate having a spinel structure ($LiMn_2O_4)_4$, lithium manganate having a rock salt structure ($LiMnO_2$), and lithium iron phosphate ($LiFePO_4$) and lithium manganese phosphate ($LiMnPO_4$) having an olivine structure. Meanwhile, examples of the negative electrode active material having a volume specific resistance value of $10^3$ Ω·cm or more include negative electrode active materials such as silicon Compounds containing Si, SiO, SiC, SiOC or the like as basic constituent elements as well as Ge.

[Mixture Layer]

The mixture layer contains a secondary battery active material and graphene, and typically further contains a binder. As graphene and the secondary battery active material in the mixture layer, those described above can be used. The binder is not particularly limited, and examples thereof include fluoropolymers such as polyvinylidene fluoride (PVDF) and polytetrafluoroethylene (PTFE), rubbers such as styrene butadiene rubber (SBR) and natural rubber, polysaccharides such as carboxymethyl cellulose, a polyimide precursor and/or a polyimide resin, a polyamide imide resin, a polyamide resin, a polyacrylic acid, sodium polyacrylate, an acrylic resin, and polyacrylonitrile. These may be used as a mixture of two or more compounds. If the amount of the binder is too small, the binding strength is weak, whereas if the amount of the binder is too large, the mixture layer has high resistance. Therefore, the content of the binder in the mixture layer is preferably 0.10% by mass or more and 3.0% by mass or less, more preferably 0.2 to 1.5% by mass based on the secondary battery active material. It is still more preferable that the content of the binder be 0.2% by mass or more and 0.75% by mass or less in terms of improvement in the coatability and energy density.

The content of graphene in the mixture layer is preferably 0.10% by mass or more and 3.0% by mass or less, more preferably 0.2% by mass or more and 1.5% by mass or less based on the secondary battery active material. It is still more preferable that the content of graphene be 0.2% by mass or more and 0.75% by mass or less in terms of achieving both the coatability and battery characteristics.

In the case where the physical properties or contents of graphene and electrode materials present in the mixture layer are analyzed, the electrode materials and graphene are separated from each other in the following manner. First, a battery is disassembled in an Ar glove box, and the electrode is washed with dimethyl carbonate and vacuum-dried in a side box of the Ar glove box for 1 hour. Then, the mixture layer is peeled off from the current collector foil using a spatula, the obtained powder is dissolved in a solvent such as N-methylpyrrolidone (NMP) or water, and the resulting solution is filtered to separate the solution into a residue (secondary battery active material, conductive additive, and solvent) and a filtrate (solvent and others). The obtained residue is vacuum-dried, a solvent in an amount of 5-fold the weight of the residue is added again to the residue, and the secondary battery active material is separated from the conductive additive using an apparatus capable of applying a strong shear force such as FILMIX (registered trademark) model 30-30 (PRIMIX Corporation) or a wet jet mill. The obtained treated product is dried and weighed, and then the secondary battery active material is dissolved using an acid such as hydrochloric acid or nitric acid, and the resulting solution is filtered to separate the solution into a residue (conductive additive) and a filtrate (dissolved electrode active material and water). Further, the residue is washed with water, dried, and weighed, whereby the content of graphene in the mixture layer can be measured.

In the secondary battery electrode according to the present invention, conductive material portions in a cross section of the secondary battery electrode have an average aspect ratio of 2.0 or more. In the present invention, the conductive material portions in a cross section of the electrode are portions determined by the following method.

(1) First, a mapping image and a histogram of spreading resistance values of a mixture layer portion are acquired by scanning spreading resistance microscopy (SSRM).

The SSRM is a technique of visualizing the spreading resistance immediately below a conductive probe by applying a bias voltage to a sample, scanning a surface of the sample with the probe, and measuring the distribution of resistance values two-dimensionally. Since the applied bias voltage is rapidly attenuated immediately below the probe, only the resistance immediately below the probe is detected. Such local resistance is called spreading resistance.

As pretreatment for the measurement by the SSRM, first, the voids of the electrode are filled with a resin material. The resin material used may be an epoxy resin, a methacrylic acid resin, a polyester resin or the like. Then, a cross section is cut out of the electrode using an apparatus for processing the electrode cross section. The apparatus for processing the electrode cross section used may be an ion milling system. Then, the obtained machined surface is scanned by the SSRM, whereby it is possible to measure the spreading resistance values of the electrode cross section. From the obtained spreading resistance values, a mapping image and a histogram showing a frequency distribution can be obtained.

Figure 1:
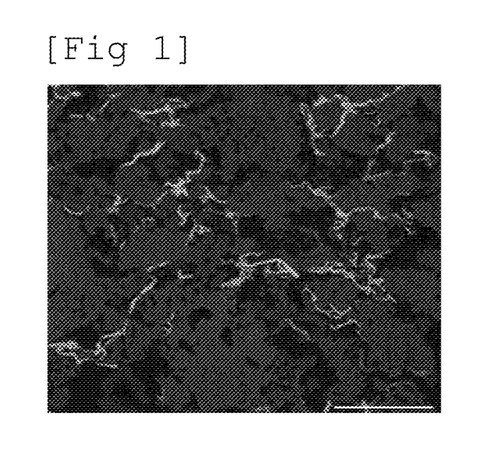
FIG. 1 is a mapping image of a secondary battery electrode produced in Example 1.

Furthermore, from the mapping image obtained in the measurement by the SSRM, an image of a mixture portion, that is, an image of a portion other than a current collector is obtained (see FIG. 1). In this case, the scale bar is preferably left since it serves as a reference for particle shape measurement described later. Then, a histogram showing the frequency distribution of spreading resistance values is acquired from the mapping image (see FIG. 2).

(2) Then, the lowest resistance value in the histogram is defined as R1 the frequency is sequentially accumulated from R1 the spreading resistance value when the cumulative frequency exceeds 3% of the cumulative frequency of entire data of the mixture is defined as R2, the spreading resistance value that is 10 times of R2 is further defined as R3, the mapping image is binarized with R3 as a threshold, and portions having a resistance value equal to or less than R3 are defined as the conductive material portions.

The binarization is processing of converting a grayscale image into two levels of gray with a certain threshold as a boundary. Typically, it is preferable in a mapping image to set a value of a pixel having a resistance value equal to or less than R3 as 1 (white), and set a value of a pixel having a resistance value larger than R3 as 0 (black). As a result, a binarized image in which the conductive material portions are white and other portions are black (see FIG. 3) is obtained.

The average aspect ratio of the conductive material portions can be determined by analyzing the binarized image obtained as described above using image analysis software. Although any software can be used as the image analysis software, it is preferable to use software having a function of calculating the area, aspect ratio, distance between centroids, circularity coefficient, and perimeter length, such as the image analyzing particle size distribution measurement software Mac-View Ver. 4.0 manufactured by Mountech Co., Ltd.

In the following, a procedure of image analysis using Mac-View Ver. 4.0 will be described. First, a binarized mapping image is scanned, and conductive material portions are selected. For the selection of particles, there are manual selection in which each particle is selected with a dedicated pen or mouse for a personal computer, and automatic selection in which measurement conditions are input to automatically select particles. Since manual selection is subject to deviation of analysis results due to human-induced influence, the particles are selected by automatic selection. Automatic selection is performed with an acquisition mode of color difference, a detection tolerance of 72 (highest), a detection accuracy of 0.5 (low), a scan density of 10 (highest density), and the number of scans of 3. After completion of the selection of the conductive material portions by the automatic selection, if a site where the conductive material portions are absent is selected, the selection is canceled. Then, the scale is set based on the scale bar, and data is registered to complete the preprocessing. The image analysis is automatically performed by retrieving the preprocessed data. In the image analysis, conductive material portions having an area of 0.5 $\mu m^2$ or less are excluded from the analysis.

The average aspect ratio of the conductive material portions in the above-mentioned binarized image reflects the flowability of electrons in the film thickness direction. If the average aspect ratio is less than 2.0, it becomes difficult to flow electrons in the film thickness direction, and the electronic resistance of the electrode increases. The average aspect ratio is preferably 2.5 or more, more preferably 2.7 or more. Meanwhile, the average aspect ratio is preferably 3.0 or less, because if the aspect ratio is too large, the contact between the graphene layers may increase to increase the resistance. The aspect ratio is a value obtained by dividing the longest diameter by the shortest diameter, and the average value of all the selected conductive material portions is taken as the average aspect ratio.

If the area rate of the conductive material portions in the mixture layer is less than 4%, the electronic resistance of the electrode increases, whereas if it exceeds 8%, the energy density decreases. Therefore, the area rate is preferably 4% or more and 8% or less, more preferably 5% or more and 7% or less. The area rate of the conductive material portions in the mixture layer is obtained by dividing the area of the conductive material portions by the total area of the mixture layer in the same binarized image as that used in the determination of the aspect ratio described above.

The circularity coefficient of the conductive material portions in the above-mentioned binarized image is preferably 0.3 or less. The circularity coefficient is a value obtained by dividing the area of the particles by 4n by the square of the perimeter length, and is expressed by the following equation.

Circularity coefficient=(4π×area of particles)/(perimeter length)$^2$

Herein, the average value of all the selected conductive material portions is defined as the circularity coefficient. The circularity coefficient reflects the degree of aggregation of the conductive material portions. If the circularity coefficient exceeds 0.3, the conductive material portions are remarkably aggregated, the proportion of a portion where the conductive additive is absent is large, and the electronic resistance of the electrode increases. The circularity coefficient is more preferably 0.25 or less, most preferably 0.2 or less.

The average area of the conductive material portions in the above-mentioned binarized image is preferably 2.1 $\mu m^2$ or less. The average area of the conductive material portions reflects the degree of aggregation of the conductive material. If the average area of the conductive material portions exceeds 2.1 $\mu m^2$, the conductive material is remarkably aggregated, the proportion of a portion where the conductive additive is absent is large, and the electronic resistance of the electrode increases. The average area is more preferably 1.5 $\mu m^2$ or less, still more preferably 1.4 $\mu m^2$ or less.

The average distance between centroids of the conductive material portions in the above-mentioned binarized image is preferably 3.5 $\mu m$ or less. The average distance between centroids is determined as follows: the centroid of one conductive material portion is taken as a reference, the distance from the centroid to the centroid of another conductive material portion nearest from the former centroid is defined as the distance between centroids, and the average value of all the selected conductive material portions is defined as the average distance between centroids. The average distance between centroids reflects the distance between conductive material portions in the electrode. If the average distance between centroids exceeds 3.5 $\mu m$, the proportion of a portion where the conductive material portions are absent is large, and the electronic resistance of the electrode increases. The average distance between centroids is preferably 2.0 $\mu m$ or more and 3.3 $\mu m$ or less. If the average distance between centroids is less than 2.0 $\mu m$, the energy density may decrease because the proportion of the conductive additive in the electrode is high.

The circularity coefficient, average area, and average distance between centroids of the conductive material portions can be determined by image analysis using the same image analysis software for binarized images as that used in the determination of the aspect ratio described above.

[Current Collector]

The secondary battery electrode according to the present invention is typically an electrode including a current collector and the above-mentioned mixture layer formed on the current collector. As the current collector, metal foil or metal mesh is preferably used. In particular, aluminum foil is preferably used in the positive electrode, and copper foil is preferably used in the negative electrode.

<Method for Producing Secondary Battery Electrode>

The secondary battery electrode according to the present invention can be produced by mixing an active material, a binder, and a graphene dispersion liquid as a conductive additive, as well as an appropriate amount of a solvent as required to prepare an electrode paste, and applying the electrode paste.

The secondary battery electrode according to the present invention is preferably produced by a production method including producing a graphene dispersion liquid by a production method including:
- a surface treatment step of mixing graphene oxide with a surface treatment agent having an acidic group in a solvent;
- a reduction step of reducing graphene oxide dispersed in a dispersion medium containing water;
- an organic solvent mixing step of mixing an intermediate dispersion liquid after the reduction step with an organic solvent; and
- a strong stirring step of stirring the intermediate dispersion liquid containing the organic solvent at a peripheral speed of a rotary blade of a mixer of 6 m/s or more and 70 m/s or less, and
- then mixing the graphene dispersion liquid with a secondary battery active-material.

It is particularly effective to perform both mixing with the organic solvent and the peeling treatment by strong stirring without drying the graphene for dispersing the graphene in the organic solvent well, because once the graphene dispersion liquid is dried, the graphene layers are strongly aggregated with each other.

[Graphene Oxide]

There is no particular limitation on the method for producing graphene oxide, and a known method such as the Hummers method can be used. Alternatively, commercially available graphene oxide may be purchased.

Although graphene oxide has high dispersibility, graphene oxide itself is insulative and cannot be used as a conductive additive or the like. If the degree of oxidation of graphene oxide is too high, the graphene powder obtained by reduction of the graphene oxide may have low electric conductivity. Therefore, the ratio of carbon atoms to oxygen atoms in graphene oxide measured by X-ray photoelectron spectroscopy is preferably 0.5 or more. Graphene oxide is measured by X-ray photoelectron spectroscopy in a state where the solvent is sufficiently dried.

In addition, unless graphite is oxidized to the inside, a flaky graphene powder is hardly obtained after the reduction. Therefore, it is desirable that no peak specific to graphite be detected when graphene oxide is dried and subjected to X-ray diffraction measurement.

The degree of oxidation of graphene oxide can be adjusted by changing the amount of the oxidizing agent used in the oxidation reaction of graphite. More specifically, the larger the amounts of sodium nitrate and potassium permanganate relative to graphite used in the oxidation reaction are, the higher the degree of oxidation is, whereas the smaller the amounts are, the lower the degree of oxidation is. The weight ratio of sodium nitrate to graphite is not particularly limited, but it is preferably 0.200 or more and 0.800 or less, more preferably 0.250 or more and 0.500 or less, still more preferably 0.275 or more and 0.425 or less. The ratio of potassium permanganate to graphite is not particularly limited, but it is preferably 1.00 or more, more preferably 1.40 or more, still more preferably 1.65 or more. Further, the ratio is preferably 4.00 or less, more preferably 3.00 or less, still more preferably 2.55 or less.

[Surface Treatment Step]

In the surface treatment step, graphene oxide is mixed with a surface treatment agent having an acidic group. The surface treatment agent exerts an effect of improving the dispersibility of graphene because it is present in a state where at least part thereof is attached to a surface of graphene. Herein, the acidic group is a hydroxy group, a phenolic hydroxy group, a nitro group, a carboxyl group, or a carbonyl group. The surface treatment agent is not particularly limited as long as it is a compound having an acidic group, that is, a hydroxy group, a phenolic hydroxy group, a nitro group, a carboxyl group, or a carbonyl group, and it may be either a high-molecular compound or a low-molecular compound.

Examples of the high-molecular compound having an acidic group include polyvinyl pyrrolidone, polyvinyl alcohol, and polymethyl vinyl ether. The low-molecular compound is preferably a compound having an aromatic ring from the viewpoint of affinity with the graphene surface. From the viewpoint of increasing the electric conductivity of graphene, a low-molecular compound is more preferable than a high-molecular compound.

In particular, a compound having a catechol group is preferable as the surface treatment agent because such a compound has adhesiveness to graphene and dispersibility in a solvent. Examples of the compound having a catechol group include catechol, dopamine hydrochloride, 3-(3,4-dihydroxyphenyl)-L-alanine, 4-(1-hydroxy-2-aminoethyl)catechol, 3,4-dihydroxybenzoic acid, 3,4-dihydroxyphenylacetic acid, caffeic acid, 4-methylcatechol, and 4-tert-butylpyrocatechol.

The acidic group of the surface treatment agent is preferably a phenolic hydroxy group. Examples of a compound having a phenolic hydroxy group include phenol, nitrophenol, cresol, catechol, and compounds having a structure in which these compounds are partially substituted.

Moreover, a surfactant having an acidic group is also suitably used as a surface treatment agent. The surfactant may be any of cationic surfactants, anionic surfactants, nonionic surfactants and the like. However, a nonionic surfactant that is not ionized is suitable for use as a battery material since anions and cations may themselves be involved in an electrochemical reaction.

Moreover, the surface treatment agent may have a basic group in addition to the acidic group. In particular, a surface treatment agent having an amino group improves the dispersibility. Therefore, a compound having both a catechol group and an amino group is particularly preferable as the surface treatment agent. An example of such a compound is dopamine hydrochloride.

In order to mix graphene oxide with the surface treatment agent well, it is preferable to mix them in a state where both the graphene oxide and the surface treatment agent are dispersed in a solvent (dispersion medium), and it is more preferable to mix them before and/or after or during the reduction step described later. In this case, it is preferable that both the graphene oxide and the surface treatment agent be completely dissolved, but part of the graphene oxide and the surface treatment agent may be dispersed as a solid without being dissolved. The solvent is preferably a polar solvent and is not particularly limited, and examples thereof include water, ethanol, methanol, 1-propanol, 2-propanol, N-methylpyrrolidone, dimethylformamide, dimethylacetamide, dimethylsulfoxide, γ-butyrolactone, and mixtures of the above-mentioned compounds.

[Reduction Step]

In the reduction step, graphene oxide dispersed in a dispersion medium containing water is reduced. The solvent used in the reduction step is preferably a polar solvent. Preferable examples of the polar solvent include water, ethanol, methanol, 1-propanol, 2-propanol, N-methylpyrrolidone, dimethylformamide, dimethylacetamide, dimethylsulfoxide, γ-butyrolactone, and mixtures of the above-mentioned compounds. In the case where the above-mentioned surface treatment agent mixing step is performed in a solvent, it is preferable to directly proceed to the reduction step in the state after completion of the surface treatment agent mixing step or to dilute the graphene oxide dispersion liquid with the same solvent as the solvent used in the surface treatment agent mixing step and reduce graphene oxide.

The method for reducing graphene oxide is not particularly limited, but chemical reduction is preferable. In the case where chemical reduction is employed, examples of the reducing agent include an organic reducing agent and an inorganic reducing agent. An inorganic reducing agent is more preferable from the viewpoint of ease of washing after the reduction.

Examples of the organic reducing agent include an aldehyde reducing agent, a hydrazine derivative reducing agent, and an alcohol reducing agent. Among them, an alcohol reducing agent is particularly suitable because it can reduce graphene oxide relatively mildly. Examples of the alcohol reducing agent include methanol, ethanol, propanol, isopropyl alcohol, butanol, benzyl alcohol, phenol, ethanolamine, ethylene glycol, propylene glycol, and diethylene glycol.

Examples of the inorganic reducing agent include sodium dithionite, potassium dithionite, phosphorous acid, sodium borohydride, and hydrazine. Among them, sodium dithionite and potassium dithionite are suitably used because they can reduce graphene oxide while holding a relatively large number of acidic groups, so that graphene having high dispersibility in a solvent can be produced.

[Washing Step]

After completion of the reduction step, graphene is preferably subjected to a washing step of diluting the dispersion liquid with water and filter the diluted liquid. The washing step improves the purity of graphene, and a gel-like dispersion liquid containing graphene dispersed in water can be obtained. Herein, apart from the finally completed graphene dispersion liquid, intermediates in the process of production, which are in a state where graphene or graphene oxide is dispersed in some dispersion medium, including a gel-like dispersion liquid are all conveniently referred to as "intermediate dispersion liquids".

[Pulverization Step]

Before and/or after or during the reduction step, it is preferable to perform a pulverization step of pulverizing graphene oxide contained in the intermediate dispersion liquid before and/or after or during the reduction step, or graphene obtained after the reduction. The pulverization step is preferably performed before or during the reduction step because it is preferable to perform the reduction step with pulverized graphene oxide in order to obtain the graphene dispersion liquid used in the present invention.

Additionally performing the pulverization step makes the size of graphene oxide or graphene in the planar direction appropriate. The technique of pulverization is not particularly limited, but a media-less dispersion method in which a strong shear force is given to the dispersion liquid without the use of grinding media is preferably employed. This is because aggregation of graphene oxide or graphene layers is induced in the case of a technique of mixing grinding media such as a plurality of beads or balls with a dispersion liquid, and causing the grinding media to collide with each other to crush and disperse graphene oxide or graphene. Examples of the media-less dispersion method include a technique of causing a pressure-applied intermediate dispersion liquid to collide against a single ceramic ball, and a technique in which a liquid-liquid shear type wet jet mill is used, the wet jet mill being capable of causing pressure-applied intermediate dispersion liquids to collide with each other for dispersion. Moreover, a technique of applying an ultrasonic wave to the intermediate dispersion liquid is also a media-less dispersion method and is preferable.

In the pulverization step, graphene oxide or graphene tends to be finer as the treatment pressure or output in the media-less dispersion method is higher, and graphene oxide or graphene tends to be finer as the treatment time is longer. The preferable size of graphene in the planar direction is as described above. It is possible to adjust the size of graphene obtained after the reduction depending on the type of the pulverization treatment, treatment conditions, and treatment time in the pulverization step. As for preferable conditions for the pulverization treatment to obtain graphene used in the present invention, the solid content concentration of graphene oxide or graphene is preferably 0.01% by mass to 2% by mass, still more preferably 0.05% by mass to 1% by mass. In the case where ultrasonic treatment is performed, the ultrasonic output is preferably 100 W or more and 3000 W or less, more preferably 200 W or more and 2000 W or less. The treatment time is preferably 10 minutes or more and 10 hours or less, more preferably 20 minutes or more and 5 hours or less, particularly preferably 30 minutes or more and 3 hours or less.

[Organic Solvent Mixing Step]

In the organic solvent mixing step, the intermediate dispersion liquid is mixed with an organic solvent in order to replace the water in the intermediate dispersion liquid having undergone the reduction step with the organic solvent. In the organic solvent mixing step, the intermediate dispersion liquid, which is obtained through the surface treatment step and the reduction step, or optionally further subjected to the washing step and/or the pulverization step, is directly mixed with an organic solvent. More specifically, from the end of the reduction step to the mixing with an organic solvent in the organic solvent mixing step, the intermediate dispersion liquid is always in the state of a dispersion liquid, and no operation of removing the dispersion medium from the intermediate dispersion liquid to recover graphene as a powder, such as lyophilization, is performed.

In the organic solvent mixing step, the mixing ratio between the intermediate dispersion liquid and the organic solvent is not particularly limited. However, if the amount of the mixed organic solvent is too small, the mixture is viscous and difficult to handle, whereas if the amount of the mixed organic solvent is too large, the amount of graphene per unit treatment amount is small, so that the treatment efficiency is poor. From the viewpoint of obtaining a low-viscosity dispersion liquid that is easy to handle and improving the treatment efficiency, the amount of the mixed organic solvent is preferably 10 to 3000 parts by mass, more preferably 20 to 2000 parts by mass, still more preferably 50 to 1500 parts by mass based on 100 parts by mass of the intermediate dispersion liquid having undergone the reduction step.

[Strong Stirring Step]

After the organic solvent mixing step, a step of stirring the intermediate dispersion liquid containing the organic solvent at a peripheral speed of a rotary blade of a mixer of 6 m/s or more and 70 m/s or less (strong stirring step) is performed. Peeling graphene in the strong stirring step can eliminate graphene stacking. Herein, a rotary blade mixer capable of giving such strong stirring power to the intermediate dispersion liquid is referred to as "strong stirring mixer".

In the strong stirring step, the peripheral speed of the rotary blade of the mixer is preferably 10 m/s or more, more preferably 30 m/s or more. The peripheral speed of the rotary blade of the mixer is defined by perimeter x rotation speed. If the peripheral speed is too low, graphene is unlikely to be peeled and the degree of peeling of graphene is low. On the other hand, if the peripheral speed is too high, the degree of peeling of graphene is too high and the dispersibility is deteriorated.

Furthermore, the shear rate is more preferably 5,000 to 50,000 per second. If the shear rate is too low, graphene is unlikely to be peeled and the degree of peeling of graphene is low. On the other hand, if the shear rate is too high, the degree of peeling of graphene is too high and the dispersibility is deteriorated. The shear rate is a value obtained by dividing the peripheral speed at the maximum diameter of the rotary blade of the mixer by the distance between the tip of the rotary blade of the mixer (the tip means the edge that determines the maximum diameter) to the wall surface.

The treatment time in the strong stirring step is preferably 15 seconds to 300 seconds, more preferably 20 seconds to 120 seconds, still more preferably 30 seconds to 80 seconds.

The strong stirring mixer used in the strong stirring step is preferably a device capable of achieving high peripheral speed, such as a planetary mixer with a disper, and ROBOMIX. Moreover, a mixer that has a shape in which the distance between the rotating blade and the wall surface is as short as 10 mm or less, such as a mixer of a thin-film spinning system or a rotor/stator system, that is of a media-less system, and that has high shear force is more preferable. Examples of such a mixer having high shear force include FILMIX (registered trademark) model 30-30 (manufactured by PRIMIX Corporation), CLEARMIX (registered trademark) CLM-0.8S (manufactured by M Technique Co., Ltd.), and SUPER SHEAR MIXER SDRT 0.35-0.75 (manufactured by SATAKE CHEMICAL EQUIPMENT MFG., LTD.).

[Water Removal Step]

The water removal step is a step of removing at least part of the water contained in the intermediate dispersion liquid by a technique of combination of addition of an organic solvent and suction filtration, or distillation. In the case of a means for solvent removal with which strong force is applied to the graphene contained in the dispersion liquid, such as pressing filtration or centrifugal separation, graphene tends to stack and aggregate. The water removal step is preferably performed at any stage after the completion of the strong stirring step, but may be performed before the strong stirring step as long as it is performed after the organic solvent mixing step.

As a technique of combining the addition of an organic solvent with the suction filtration in the water removal step, it is preferable to perform vacuum suction filtration after an organic solvent is added to the intermediate dispersion liquid and the resulting mixture is stirred. Specifically, the vacuum suction filtration can be performed by a method of filtering the intermediate dispersion liquid while suctioning the intermediate dispersion liquid with a diaphragm pump or the like using a Buchner funnel, a Kiriyama funnel or the like. Repeating the step of mixing with the organic solvent and the operation of carrying out suction filtration a plurality of times makes it possible to remove free water and adsorbed water in the intermediate dispersion liquid. As the organic solvent, those described above can be used.

When the boiling point of the organic solvent is higher than that of water, it is preferable to remove water by distillation. Although the pressure at which the distillation is performed is not limited, vacuum distillation is preferable in that water can be efficiently removed.

[Heating Step]

It is preferable to further perform a step of heating the intermediate dispersion liquid to 70° C. or higher (heating step) at any stage after the reduction step. Performing the heating step can reduce bound water in the intermediate dispersion liquid. The heating step can be performed, for example, by charging the intermediate dispersion liquid into a heating and stirring apparatus, and stirring the intermediate dispersion liquid under heating without drying the intermediate dispersion liquid. The heating temperature is more preferably 80° C. or higher. On the other hand, the heating temperature is preferably 150° C. or lower, more preferably 120° C. or lower, since some of functional groups, such as a hydroxyl group, may be eliminated from graphene under high-temperature conditions. Further, it is particularly preferable to perform the heating step simultaneously with the strong stirring step from the viewpoint of efficiently removing water.

When distillation is performed in the water removal step, it is a preferable aspect to perform the distillation while heating the intermediate dispersion liquid to 70° C. or higher because it is possible to perform the water removal step and the heating step simultaneously, and to remove free water, adsorbed water, and bound water simultaneously in single treatment. In this case, a technique of performing vacuum distillation while heating the intermediate dispersion liquid to 70° C. or higher is particularly preferable. More specifically, a technique in which an apparatus such as a rotary evaporator or a heating stirrer with a vacuum line is used can be mentioned. Although the pressure at which the distillation is performed is not limited, vacuum distillation is preferable in that water can be efficiently removed.

[Method for Producing Secondary Battery Electrode]

The graphene dispersion liquid used in the production of the secondary battery electrode preferably has a solid content of 0.3% by mass or more and 40% by mass or less. The solid content is more preferably 20% by mass or less, still more preferably 10% by mass or less, even more preferably 5% by mass or less, particularly preferably 2% by mass or less. In addition, the solid content is more preferably 0.7% by mass or more, still more preferably 1% by mass or more. When the solid content is 5% by mass or less, the graphene dispersion liquid tends to have fluidity and is excellent in the handling properties. If the solid content exceeds 40% by mass, graphene stacking tends to occur in the dispersion liquid, and a good dispersion state is hardly maintained. If the solid content is less than 0.3% by mass, in the case where the graphene dispersion liquid is used in the production of an electrode paste, the electrode paste tends to be poor in coatability since the electrode paste has a low solid content due to the solvent in the dispersion liquid and has low viscosity.

The solid content of the graphene dispersion liquid can be calculated by measuring the weight of the graphene dispersion liquid after drying the solvent in the dispersion liquid, and dividing the measured value by the weight of the graphene dispersion liquid itself. More specifically, about 1 g of the graphene dispersion liquid is attached to a glass substrate having a known weight, the glass substrate is heated on a hot plate temperature-controlled to 120° C. for 1.5 hours to volatilize the solvent, and the weight of the remaining graphene is measured.

The binder used can be those mentioned as for the secondary battery electrode, and it is preferable to use a binder solution containing the binder previously dissolved in a solvent. Examples of the used solvent include NMP, γ-butyrolactone, water, and dimethylacetamide, and it is most preferable to use NMP that is a solvent contained in the graphene dispersion liquid used in the present invention. The concentration of the binder solution is preferably 3% by mass or more and 20% by mass or less, more preferably 5% by mass or more and 10% by mass or less. If the concentration is too low, the electrode paste may form a lump, whereas if the concentration is too high, the binder may not be sufficiently dissolved, and the binding between the mixture layer and the current collector foil may be reduced.

Then, the graphene dispersion liquid and the binder solution are mixed. As a device for the mixing, a device capable of applying shear force is preferable. For example, a planetary mixer, FILMIX (registered trademark) (PRIMIX Corporation), a rotation-revolution mixer, and a planetary ball mill can be mentioned.

After that, the resulting mixture is further mixed with an active material, and the mixture is diluted with a solvent to produce an electrode paste. Examples of the solvent used in the dilution include NMP, Y-butyrolactone, water, and dimethylacetamide, and it is most preferable to use NMP that is a solvent contained in the graphene dispersion liquid of present invention. The amount of NMP added, which is required for dilution, can be an amount capable of adjusting the electrode paste to have a viscosity suitable for coating. If the viscosity (25° C., Brookfield viscometer LVDVII+, rotor No. 6, 60 rpm) is too high, coating failure will occur, whereas if it is too low, graphene will tend to segregate on the electrode surface. Therefore, a viscosity suitable for application of the electrode paste is, for example, 2000 to 10000 mPa·s, preferably 3000 to 7000 mPa·s, more preferably 4000 to 6000 mPa·s.

The electrode paste thus obtained is applied to current collector foil, dried, and then pressed using a press, whereby a secondary battery electrode can be produced.

EXAMPLES

Measurement Example 1

Method of Measuring Shape of Conductive Material Portions

Voids of each of the electrodes obtained in examples and comparative examples were filled with an epoxy resin. Then, a cross section was cut out of the electrode using an ion milling system (IM4000 manufactured by Hitachi High-Technologies Corporation). The spreading resistance values of the electrode cross section were measured by scanning spreading resistance microscopy. Then, from the data of the obtained mapping image of 512 pixels by 512 pixels, the data of the current collector foil was excluded to form another image data. In the histogram (frequency distribution) of the image data, the frequency was sequentially accumulated from R1 that was the lowest resistance value in the histogram, the spreading resistance value when the cumulative frequency was 3% of the cumulative frequency of entire measurement data of the mixture layer was defined as R2, and the spreading resistance value R3 (threshold for binarization) that was 10 times of R2 was further obtained. A value of a pixel having a resistance value equal to or less than R3 was set as 1 white), and a value of a pixel having a resistance value larger than R3 was set as 0 (black) to form a binarized image.

The obtained conductive material portions were subjected to image analysis. The conductive material portions were analyzed using image analyzing particle size distribution measurement software Mac-View Ver. 4.0 manufactured by Mountech Co., Ltd. under the conditions of automatic selection shown below.

Automatic selection of particles was performed with an acquisition mode of color difference, a detection tolerance of 72 (highest), a detection accuracy of 0.5 (low), a scan density of 10 (highest density), and the number of scans of 3. Then, the scale was set based on the scale bar of the binarized image, and the image analysis was performed by the software to obtain the average area, average aspect ratio, and average distance between centroids.

Measurement Example 2

Battery Performance Evaluation

The discharge capacity was electrochemically evaluated as follows. A 2032 type coin cell was produced using, as a working electrode, an electrode produced by punching each of the electrode plates obtained in the examples and comparative examples with a punch of 05.9 mm, a lithium foil piece cut into a diameter of 16.1 mm and a thickness of 0.2 mm as a counter electrode, Celgard #2400 (manufactured by Celgard, LLC.) cut into a diameter of 17 mm as a separator, and a solvent (ethylene carbonate:diethyl carbonate=7:3) containing 1 M of $LiPF_6$ as an electrolytic solution, and the coin cell was set on a charge-discharge test system (TOSCAT-3100 manufactured by Toyo System Co., Ltd.).

In the charge/discharge measurement, the charge voltage was 4.3 V and the discharge voltage was 3.0 V, constant current charge was performed at 1 C up to the charge voltage, and then constant voltage charge was performed at the charge voltage. The end current of the constant voltage charge was 0.01 C. The charge rate was fixed at 1 C, and the discharge was performed three times at a discharge rate 1 C, followed by three times at 3 C, three times at 5 C, and three times at 10 C. The capacity at the third discharge at each rate was taken as the discharge capacity. The ratio of 5 C discharge capacity to 1 C discharge capacity (5 C discharge capacity/1 C discharge capacity) obtained by the measurement was taken as high output characteristics. The energy density was calculated by the following equation.

$$\text{Energy density[Wh/kg]}=3.75\ [V]\times 1\ C\ \text{discharge capacity [mAh/g]} \times (\text{solid content of active material [g]/solid content of electrode mixture [g]}) \quad (3)$$

Synthesis Example 1

Method for Preparing Graphene Oxide Gel

Using 1500 mesh natural graphite powder (Shanghai Yifan Graphite Co., Ltd.) as a raw material, 220 ml of 98% concentrated sulfuric acid, 5 g of sodium nitrate, and 30 g of potassium permanganate were charged into 10 g of the natural graphite powder in an ice bath, the resulting mixture was mechanically stirred for 1 hour, and the temperature of the liquid mixture was kept at 20° C. or lower. The liquid mixture was taken out from the ice bath, and reacted with stirring in a water bath at 35° C. for 4 hours. Then, 500 ml of ion exchanged water was added to the liquid mixture, and the resulting suspension was reacted at 90° C. for another 15 minutes. Finally, 600 ml of ion exchanged water and 50 ml of hydrogen peroxide were charged into the suspension, and the resulting mixture was reacted for 5 minutes to give a graphene oxide dispersion liquid. The graphene oxide dispersion liquid was filtered while it was hot, metal ions were washed with a dilute hydrochloric acid solution, and the acid was washed with ion exchanged water. The washing was repeated until the pH reached 7 to prepare a graphene oxide gel. The element ratio of oxygen atoms to carbon atoms of the prepared graphene oxide gel measured by X-ray photoelectron spectroscopy was 0.53.

Synthesis Example 2

Method 1 for Preparing Graphene NMP Dispersion Liquid

The graphene oxide gel prepared in Synthesis Example 1 was diluted with ion exchanged water to a concentration of 30 mg/ml, and treated with an ultrasonic washer for 30 minutes to give a uniform graphene oxide dispersion liquid.

The graphene oxide dispersion liquid in an amount of 20 ml was mixed with 0.3 g of dopamine hydrochloride as a surface treatment agent, and the mixture was treated with a homodisper model 2.5 (PRIMIX Corporation) at a rotation speed of 3000 rpm for 60 minutes. After the treatment, the graphene oxide dispersion liquid was diluted with ion exchanged water to 5 mg/ml, 0.3 g of sodium dithionite was added to 20 ml of the diluted dispersion liquid, and the mixture was subjected to reduction reaction at 40° C. for 1 hour. Then, a washing step of filtering the resulting product with a vacuum suction filter and then diluting the filtrate to 0.5% by mass with water and subjecting the diluted liquid to suction filtration was repeated five times. After washing, the resulting liquid was diluted with NMP to 0.5% by mass, and treated with FILMIX (registered trademark) model 30-30 (PRIMIX Corporation) at a peripheral speed of 40 m/s (shear rate: 40,000/sec) for 60 seconds (strong stirring step) for suction filtration. After the filtration, the liquid was diluted with NMP to 0.5% by mass, and a step of subjecting the liquid to suction filtration with a homodisper model 2.5 (PRIMIX Corporation) at a rotation speed of 3000 rpm for 30 minutes was repeated twice to give a graphene NMP dispersion liquid. Since the concentration of the obtained dispersion liquid was 3.4% by mass, NMP was added to adjust the concentration of the dispersion liquid to 2.0% by mass, and the resulting mixture was treated using a planetary mixer at a rotation speed of 20 rpm for 30 minutes to give a graphene NMP dispersion liquid (2.0% by mass).

Synthesis Example 3

Method 2 for Preparing Graphene NMP Dispersion Liquid

The graphene oxide gel prepared in Synthesis Example 1 was diluted with ion exchanged water to 5 mg/ml, treated with an ultrasonic washer for 30 minutes, then 0.3 g of sodium dithionite was added to 20 ml of the dispersion liquid obtained by the dilution, and the mixture was subjected to reduction reaction at 40° C. for 1 hour. Then, the mixture was filtered with a vacuum suction filter, further diluted with water to 0.7% by mass, and lyophilized to give a graphene powder. NMP was added to the graphene powder to adjust the concentration of the dispersion liquid to 2.0% by mass, and the resulting mixture was treated using a planetary mixer at a rotation speed of 20 rpm for 30 minutes to give a graphene NMP dispersion liquid (2.0% by mass).

Synthesis Example 4

Method 3 for Preparing Graphene NMP Dispersion Liquid

A graphene NMP dispersion liquid (2.0% by mass) was obtained in the same manner as in Synthesis Example 2 except that in Synthesis Example 2, 0.3 g of dopamine hydrochloride was not mixed as a surface treatment agent.

Example 1

Figure 2:
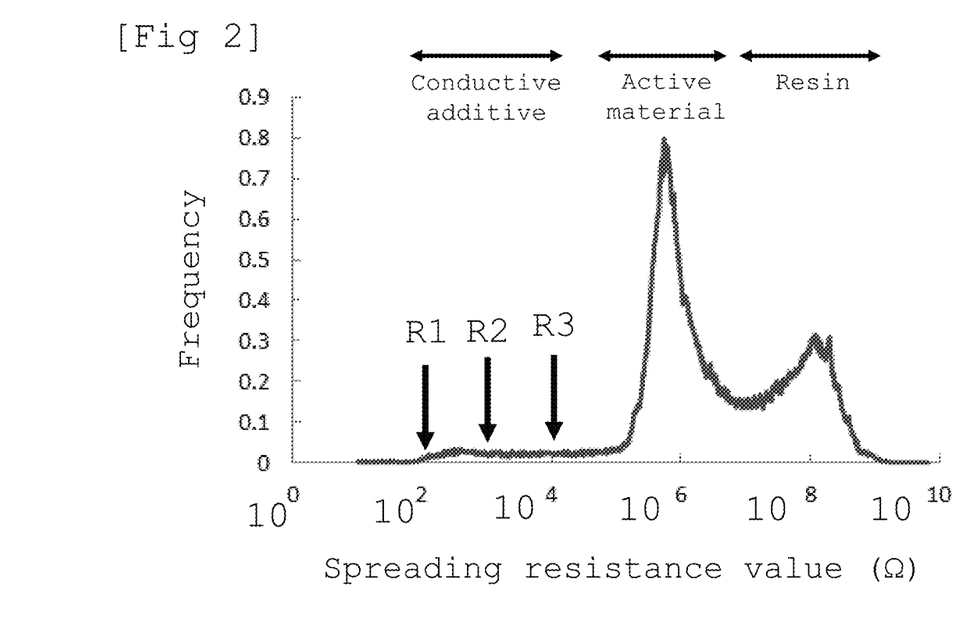
FIG. 2 is a histogram of the secondary battery electrode produced in Example 1.
Figure 3:
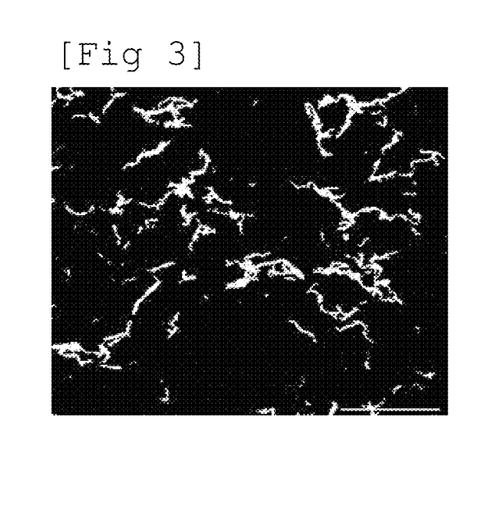
FIG. 3 is a binarized image of the secondary battery electrode produced in Example 1.

The graphene dispersion liquid (2.0% by mass) prepared in Synthesis Example 2 as a conductive additive in an amount of 1.5 parts by weight in terms of graphene solid content, and polyvinylidene fluoride #7200 (manufactured by KUREHA CORPORATION) as a binder in an amount of 5 parts by weight in terms of binder solid content were added, and mixed using a planetary mixer at 15 rpm for 30 minutes. Here, the binder used was previously dissolved in NMP to make an 8% by mass solution. Then, 100 parts by weight of lithium manganate ($LiMn_2O_4$) was added as an active material, and the materials were mixed using a planetary mixer at 30 rpm for 30 minutes. Further, 100 parts by weight of NMP as a solvent was blended with the mixture, and the resulting mixture was mixed using a planetary mixer at 15 rpm for 30 minutes to give an electrode paste. The electrode paste was applied to an aluminum foil piece (thickness: 18 μm) using a doctor blade, dried at 80° C. for 30 minutes, and then pressed using a hydraulic press at a pressure of 20 kg·f/cm² at room temperature. The resulting product was vacuum-dried at 120° C. for 5 hours using a glass tube oven to produce an electrode plate. The electrode mixture layer (excluding the aluminum foil) was 50 μm. A distribution image of spreading resistance values (mapping image), a histogram (frequency distribution), and a binarized image for the electrode plate obtained by the method of Measurement Example 1 are shown in FIGS. 1, 2, and 3, respectively. The values of R1 R2, and R3 in FIG. 2 are 105Ω, 3088Ω, and 30880Ω, respectively.

Example 2

An electrode plate was produced under the same conditions as in Example 1 except that the graphene dispersion liquid (2.0% by mass) prepared in Synthesis Example 2 as a conductive additive in an amount of 0.5 parts by weight in terms of graphene solid content, and polyvinylidene fluoride #7200 (manufactured by KUREHA CORPORATION) as a binder in an amount of 1.0 part by weight in terms of binder solid content were used.

Example 3

An electrode plate was produced under the same conditions as in Example 1 except that the graphene dispersion liquid (2.0% by mass) prepared in Synthesis Example 2 as a conductive additive in an amount of 0.5 parts by weight in terms of graphene solid content, and polyvinylidene fluoride #7200 (manufactured by KUREHA CORPORATION) as a binder in an amount of 0.5 parts by weight in terms of binder solid content were used.

Example 4

An electrode plate was produced under the same conditions as in Example 1 except that the graphene dispersion liquid (2.0% by mass) prepared in Synthesis Example 2 as a conductive additive in an amount of 0.2 parts by weight in terms of graphene solid content, and polyvinylidene fluoride #7200 (manufactured by KUREHA CORPORATION) as a binder in an amount of 0.2 parts by weight in terms of binder solid content were used.

Example 5

An electrode plate was produced under the same conditions as in Example 1 except that the graphene dispersion liquid (2.0% by mass) prepared in Synthesis Example 2 as a conductive additive in an amount of 0.75 parts by weight in terms of graphene solid content, and polyvinylidene fluoride #7200 (manufactured by KUREHA CORPORATION) as a binder in an amount of 1.0 part by weight in terms of binder solid content were used.

Example 6

An electrode plate was produced under the same conditions as in Example 1 except that the graphene dispersion liquid (2.0% by mass) prepared in Synthesis Example 2 as a conductive additive in an amount of 3.0 parts by weight in terms of graphene solid content, and polyvinylidene fluoride #7200 (manufactured by KUREHA CORPORATION) as a binder in an amount of 3.0 parts by weight in terms of binder solid content were used.

Comparative Example 1

Figure 4:
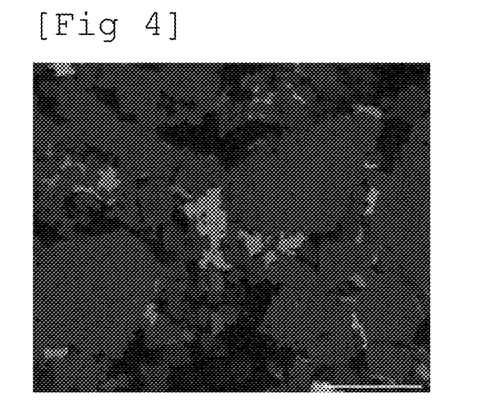
FIG. 4 is a mapping image of a secondary battery electrode produced in Comparative Example 1.
Figure 5:
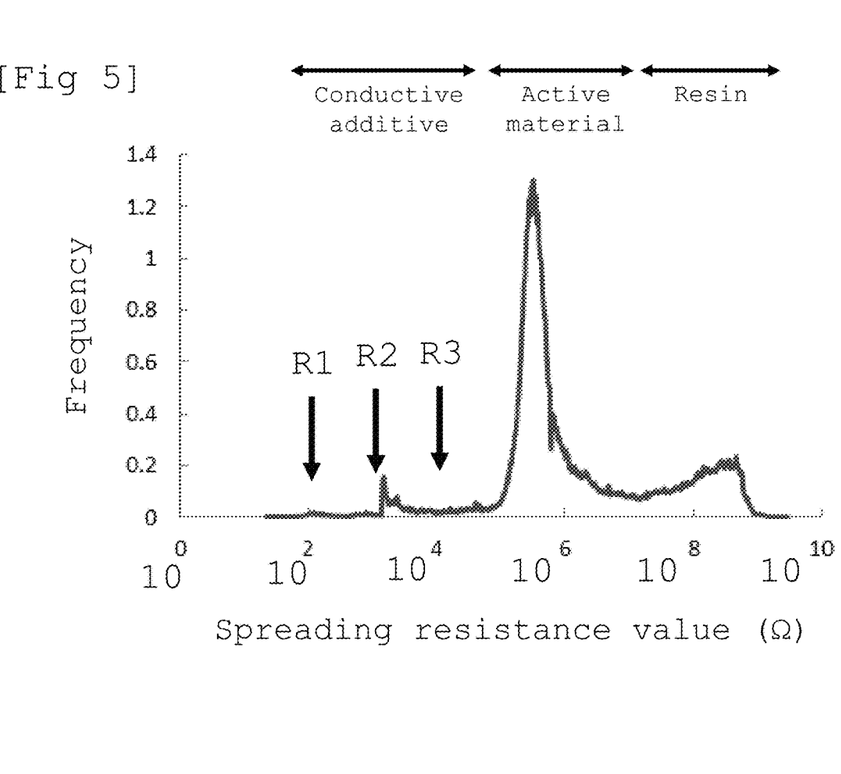
FIG. 5 is a histogram of the secondary battery electrode produced in Comparative Example 1.
Figure 6:
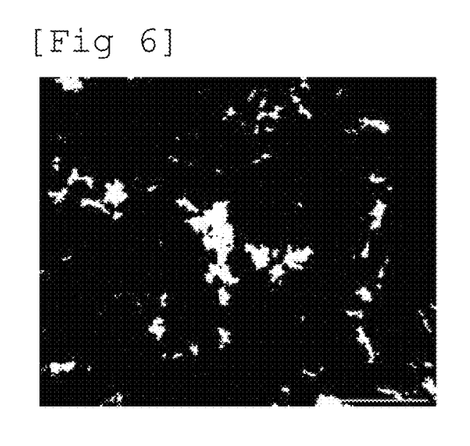
FIG. 6 is a binarized image of the secondary battery electrode produced in Comparative Example 1.

An electrode was produced in the same manner as in Example 1 except that 1.5 parts by weight of acetylene black (DENKA BLACK (registered trademark) manufactured by DENKI KAGAKU KOGYO KABUSHIKI KAISHA) as a conductive additive in the form of a powder, and polyvinylidene fluoride #7200 manufactured by KUREHA CORPORATION) as a binder in an amount of 5 parts by weight in terms of binder solid content were added, and mixed using a planetary mixer, and that 25 parts by weight of NMP as a solvent was blended. A distribution image of spreading resistance values (mapping image), a histogram (frequency distribution), and a binarized image for the electrode plate obtained by the method of Measurement Example 1 are shown in FIGS. 4, 5, and 6, respectively. The values of R1 R2, and R3 in FIG. 5 are 95.5Ω, 3236Ω, and 32360Ω, respectively.

Comparative Example 2

Figure 7:
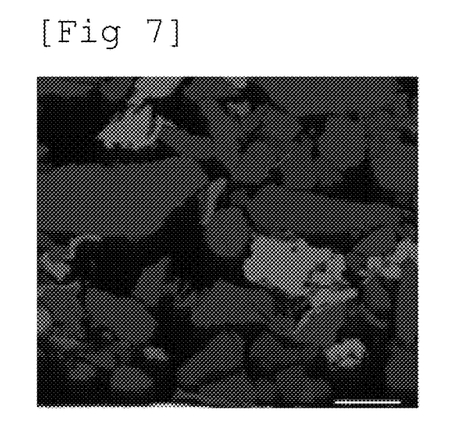
FIG. 7 is a mapping image of a secondary battery electrode produced in Comparative Example 2.
Figure 8:
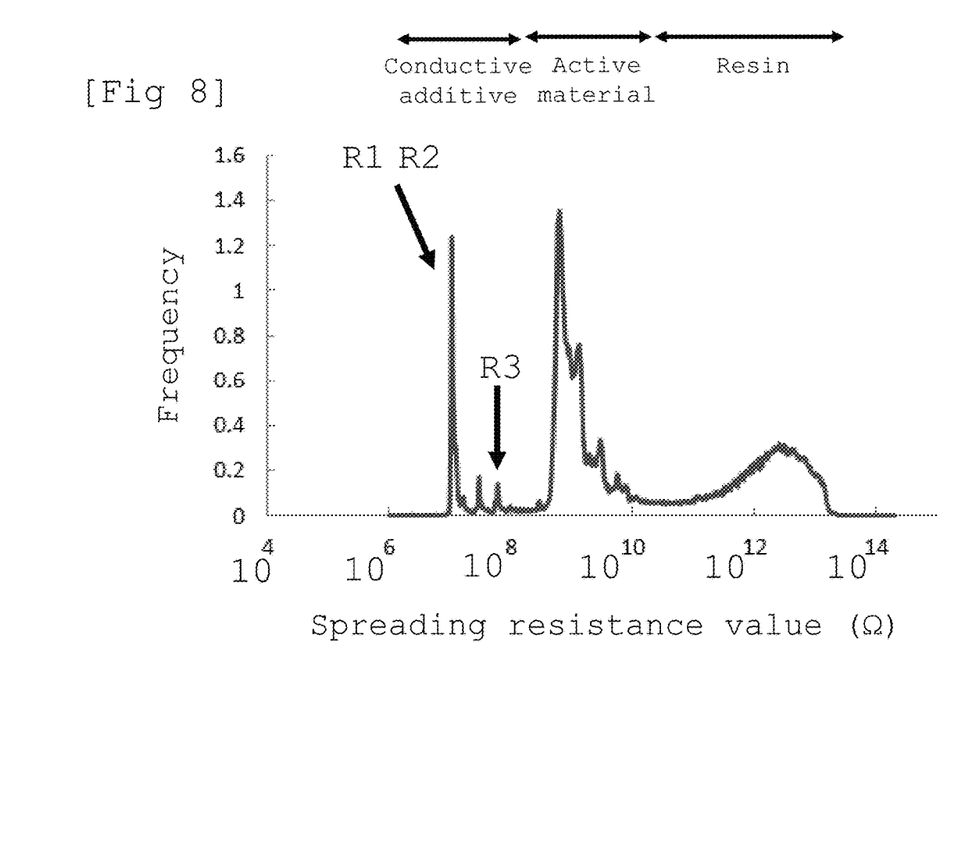
FIG. 8 is a histogram of the secondary battery electrode produced in Comparative Example 2.
Figure 9:
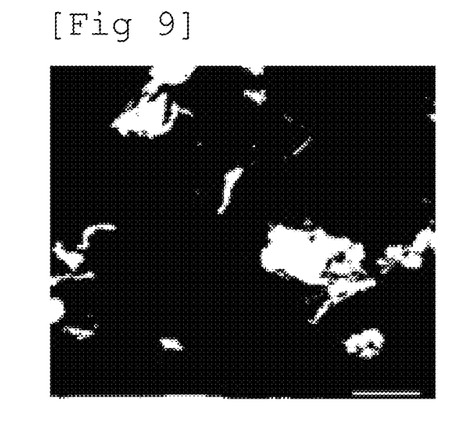
FIG. 9 is a binarized image of the secondary battery electrode produced in Comparative Example 2.

An electrode was produced in the same manner as in Example 1 except that the graphene dispersion liquid prepared in Synthesis Example 3 was used as a conductive additive. A distribution image of spreading resistance values (mapping image), a histogram (frequency distribution), and a binarized image for the electrode plate obtained by the method of Measurement Example 1 are shown in FIGS. 7, 8, and 9, respectively. The values of R1 R2, and R3 in FIG. 8 are 9185809Ω, 11178075Ω, and 111780750Ω, respectively.

Comparative Example 3

An electrode was produced in the same manner as in Example 1 except that 3.0 parts by weight of acetylene black (DENKA BLACK (registered trademark) manufactured by DENKI KAGAKU KOGYO KABUSHIKI KAISHA) as a conductive additive in the form of a powder, and polyvinylidene fluoride #7200 (manufactured by KUREHA CORPORATION) as a binder in an amount of 3.0 parts by weight in terms of binder solid content were added, and mixed using a planetary mixer, and that 40 parts by weight of NMP as a solvent was blended.

Comparative Example 4

An electrode was produced in the same manner as in Comparative Example 1 except that a graphene powder (manufactured by CNano Technology) was used as a conductive additive.

Comparative Example 5

An electrode was produced in the same manner as in Example 1 except that the graphene dispersion liquid prepared in Synthesis Example 4 was used as a conductive additive.

The average area, average aspect ratio, average distance between centroids, and circularity coefficient obtained by image analysis of the electrodes produced in the examples and comparative examples according to the method of Measurement Example 1, and results of battery performance evaluation obtained by the method of Measurement Example 2 are collectively shown in Table 1.

TABLE 1

| | Electrode composition (parts by mass) | | | | Image analysis results | | | | Battery performance evaluation | | | |
| | | | | | | | Average | | 1 C | 5 C | High output | |
| | | | | Poly- | Average | Average | distance | | capacity | capacity | characteristics | Energy |
| | | Acetylene | | vinylidene | area | aspect | between centroids | Circularity | (mAh/ | (mAh/ | (5 C capacity/ | density |
| | $LiMn_2O_4$ | black | Graphene | fluoride | ($\mu m^2$) | ratio | ($\mu m$) | coefficient | g) | g) | 1 C capacity) | (Wh/kg) |
|---|---|---|---|---|---|---|---|---|---|---|---|---|
| Example 1 | 100 | 0 | 1.5 | 5 | 1.43 | 2.78 | 2.73 | 0.28 | 105 | 90 | 0.86 | 370 |
| Example 2 | 100 | 0 | 0.5 | 1 | 1.39 | 2.53 | 3.41 | 0.26 | 106 | 95 | 0.90 | 392 |
| Example 3 | 100 | 0 | 0.5 | 0.5 | 1.41 | 2.65 | 3.28 | 0.27 | 109 | 97 | 0.89 | 405 |
| Example 4 | 100 | 0 | 0.2 | 0.2 | 1.47 | 2.73 | 3.55 | 0.27 | 103 | 84 | 0.82 | 385 |

TABLE 1-continued

| | Electrode composition (parts by mass) | | | | Image analysis results | | | | Battery performance evaluation | | | |
|---|---|---|---|---|---|---|---|---|---|---|---|---|
| | LiMn$_2$O$_4$ | Acetylene black | Graphene | Poly-vinylidene fluoride | Average area (μm$^2$) | Average aspect ratio | Average distance between centroids (μm) | Circularity coefficient | 1 C capacity (mAh/g) | 5 C capacity (mAh/g) | High output characteristics (5 C capacity/ 1 C capacity) | Energy density (Wh/kg) |
| Example 5 | 100 | 0 | 0.75 | 1 | 1.50 | 2.56 | 3.15 | 0.29 | 106 | 93 | 0.88 | 391 |
| Example 6 | 100 | 0 | 3 | 3 | 2.00 | 2.12 | 2.31 | 0.30 | 104 | 88 | 0.85 | 368 |
| Comparative Example 1 | 100 | 1.5 | 0 | 5 | 2.27 | 1.79 | 3.73 | 0.47 | 90 | 45 | 0.50 | 317 |
| Comparative Example 2 | 100 | 0 | 1.5 | 5 | 20.89 | 1.73 | 11.51 | 0.38 | 30 | 4 | 0.13 | 106 |
| Comparative Example 3 | 100 | 3 | 0 | 3 | 2.31 | 1.67 | 3.30 | 0.48 | 95 | 53 | 0.56 | 336 |
| Comparative Example 4 | 100 | 0 | 1.5 | 5 | 10.43 | 1.71 | 8.30 | 0.35 | 96 | 62 | 0.65 | 338 |
| Comparative Example 5 | 100 | 0 | 1.5 | 5 | 2.17 | 1.75 | 4.00 | 0.20 | 97 | 65 | 0.67 | 342 |

The invention claimed is:

1. A secondary battery electrode comprising a mixture layer containing graphene and a secondary battery active material,
wherein the mixture layer comprises conductive material portions in a cross section of the secondary battery electrode, the conductive material portions having an average aspect ratio of 2.0 or more and 3.0 or less, the aspect ratio of the conductive material portions being determined by a method described below;
wherein the method of determining the average aspect ratio of the conductive material portions comprises:
(1) acquiring a mapping image and a histogram of spreading resistance values of a mixture layer portion by scanning spreading resistance microscopy;
(2) defining a lowest resistance value in the histogram as R1, sequentially accumulating frequency from R1, defining a spreading resistance value when a cumulative frequency exceeds 3% of a cumulative frequency of entire data as R2, further defining a spreading resistance value that is 10 times R2 as R3, binarizing the mapping image with R3 as a threshold, and defining portions having a resistance value equal to or less than R3 as the conductive material portions; and
(3) performing image analysis of the binarized mapping image to determine the average aspect ratio of the conductive material portions.

2. The secondary battery electrode according to claim 1, wherein the secondary battery active material has a specific resistance value of $10^2$ Ω·cm or more.

3. The secondary battery electrode according to claim 1, wherein the conductive material portions have a circularity coefficient of 0.3 or less.

4. The secondary battery electrode according to claim 1, wherein the conductive material portions have an average area of 2.1 μm$^2$ or less.

5. The secondary battery electrode according to claim 1, wherein the conductive material portions have an average distance between centroids of 3.5 μm or less.

6. The secondary battery electrode according to claim 1, wherein the conductive material portions have an area rate of 4% or more and 8% or less.

7. The secondary battery electrode according to claim 1, having a content of the graphene in the mixture layer of 0.10% by mass or more and 3.0% by mass or less based on the secondary battery active material.

8. The secondary battery electrode according to claim 1, wherein the mixture layer contains a binder, and the secondary battery electrode has a content of the binder in the mixture layer of 0.10% by mass or more and 3.0% by mass or less based on the secondary battery active material.

9. A secondary battery comprising the secondary battery electrode according to claim 1.

* * * * *